A United States Patent

(12) United States Patent
Koga et al.

(10) Patent No.: US 6,534,217 B2
(45) Date of Patent: Mar. 18, 2003

(54) POSITIVE ELECTRODE MATERIAL AND SECONDARY BATTERY USING THE SAME

(75) Inventors: Keizou Koga, Fukushima (JP); Yosuke Hosoya, Fukushima (JP); Junji Kuyama, Miyagi (JP); Masayuki Nagamine, Fukushima (JP)

(73) Assignee: Sony Corporation, Tokyo (JP)

( * ) Notice: Subject to any disclaimer, the term of this patent is extended or adjusted under 35 U.S.C. 154(b) by 107 days.

(21) Appl. No.: 09/760,677

(22) Filed: Jan. 16, 2001

(65) Prior Publication Data

US 2001/0053480 A1 Dec. 20, 2001

(30) Foreign Application Priority Data

Jan. 14, 2000 (JP) ........................................ 2000-010206

(51) Int. Cl.$^7$ ............................................. H01M 10/24
(52) U.S. Cl. ................................. 429/231.95; 429/218.1
(58) Field of Search ........................... 429/231.95, 218.1

(56) References Cited

U.S. PATENT DOCUMENTS 6,207,326 B1 * 3/2001 Kawakami et al. ....... 429/218.1
6,372,385 B1 * 4/2002 Kweon et al. ........... 429/218.1

* cited by examiner

Primary Examiner—Patrick Ryan
Assistant Examiner—M. Wills
(74) Attorney, Agent, or Firm—Sonnenschein, Nath & Rosenthal

(57) ABSTRACT

Disclosed is a positive electrode material having improved charging/discharging cycle characteristic, shelf stability, and discharge load characteristic, and a secondary battery using the material. A rolled electrode body obtained by rolling strip-shaped positive and negative electrodes with a separator inbetween is provided on the inside of a battery can. The separator is impregnated with an electrolytic solution. The positive electrode contains a positive electrode material in which a coating portion is provided on the surface of a center portion made of a lithium composite oxide such as $LiMn_2O_4$. The coating portion is made of a conductive oxide such as ITO (indium tin oxide) or $SnO_2$. The quantity of the coating portion is 0.001 mol to 0.1 mol per 1 mol of the center portion. By the technique, while assuring conductivity, elution of the positive electrode material into the electrolytic solution can be suppressed and a reaction product can be prevented from being deposited on the surface of the positive electrode.

17 Claims, 2 Drawing Sheets

POSITIVE ELECTRODE MATERIAL AND SECONDARY BATTERY USING THE SAME

RELATED APPLICATION DATA

The present application claims priority to Japanese Application No. P2000-010206 filed Jan. 14, 2000, which application is incorporated herein by reference to the extent permitted by law.

BACKGROUND OF THE INVENTION

1. Field of the Invention

The present invention relates to a positive electrode material capable of occluding and releasing a light metal and a secondary battery using the positive electrode material.

2. Description of the Related Art

In recent years, with progress in electronic techniques, a small portable electronic device typified by a camcorder (video cassette recorder), a portable telephone, or a laptop computer is being developed. Consequently, as a driving source of the device, attention is paid to a small and light lithium ion secondary battery capable of obtaining high energy density.

As a positive electrode material of the lithium ion secondary battery, for example, a lithium composite oxide such as lithium cobalt composite oxide, a lithium nickel composite oxide, or a lithium manganese composite oxide is very promising since it realizes a large capacity.

When such a lithium composite oxide is used as a positive electrode material, however, the lithium composite oxide and an electrolyte react with each other as charging and discharging are repeated, a reaction product is deposited on the surface of the positive electrode. It promotes polarization and causes a problem such that a charging/discharging cycle characteristic, shelf stability, and a discharge load characteristic deteriorate.

Japanese Unexamined Patent Application No. HEI 9-147836 discloses a lithium secondary battery in which a predetermined metal element is carried on the surface of the positive electrode. In the case where a metal is carried, it is feared that the carried metal elutes and exerts an influence on a battery reaction. Japanese Unexamined Patent Application No. HEI 8-102332 discloses a secondary battery in which a low-active oxide or a low-active metal having a property of electrochemically decomposing a nonaqueous electrolytic solution rather than a lithium oxide is dispersed and held in a part of the particulate surface of a positive electrode active substance. When the carried metal is dispersed and held, however, there is the possibility of the elution. When a low-active oxide such as CaO is dispersed and held, a problem such that conductivity in the positive electrode cannot be sufficiently obtained arises.

SUMMARY OF THE INVENTION

The invention has been achieved in consideration of the problems and its object is to provide a positive electrode material having improved charging/discharging cycle characteristic, shelf stability, and discharge load characteristic by preventing a reaction product from being deposited on the surface of the positive electrode by suppressing elusion of the positive electrode material while assuring conductivity, and to provide a secondary battery using the positive electrode material.

In a positive electrode material according to the present invention, a coating portion made of a conductive oxide is provided on at least a part of a particulate substance capable of occluding and releasing a light metal, and the quantity of the conductive oxide coated is in a range from 0.001 mol to 0.1 mol per 1 mol of the particulate substance.

A secondary battery according to the present invention has a positive electrode, a negative electrode, and an electrolyte, the positive electrode includes a positive electrode material in which a coating portion made of a conductive oxide is provided on at least a part of a particulate center portion capable of occluding and releasing a light metal, and a quantity of the conductive oxide coated in the positive electrode material is in a range from 0.001 mol to 0.1 mol per 1 mol of the particulate substance.

In the positive electrode material according to the present invention, since the coating portion made of a conductive oxide is provided on at least a part of the center portion, elution is suppressed and high conductivity is realized.

In the secondary battery according to the invention, since the positive electrode uses the positive electrode material of the invention, the conductivity in the positive electrode is assured, elution of the positive electrode material is suppressed, and a reaction product caused by the elution of the positive electrode material can be prevented from being made and deposited on the surface of the positive electrode.

Other and further objects, features and advantages of the invention will appear more fully from the following description.

DETAILED DESCRIPTION OF THE PREFERRED EMBODIMENTS

Figure 1:
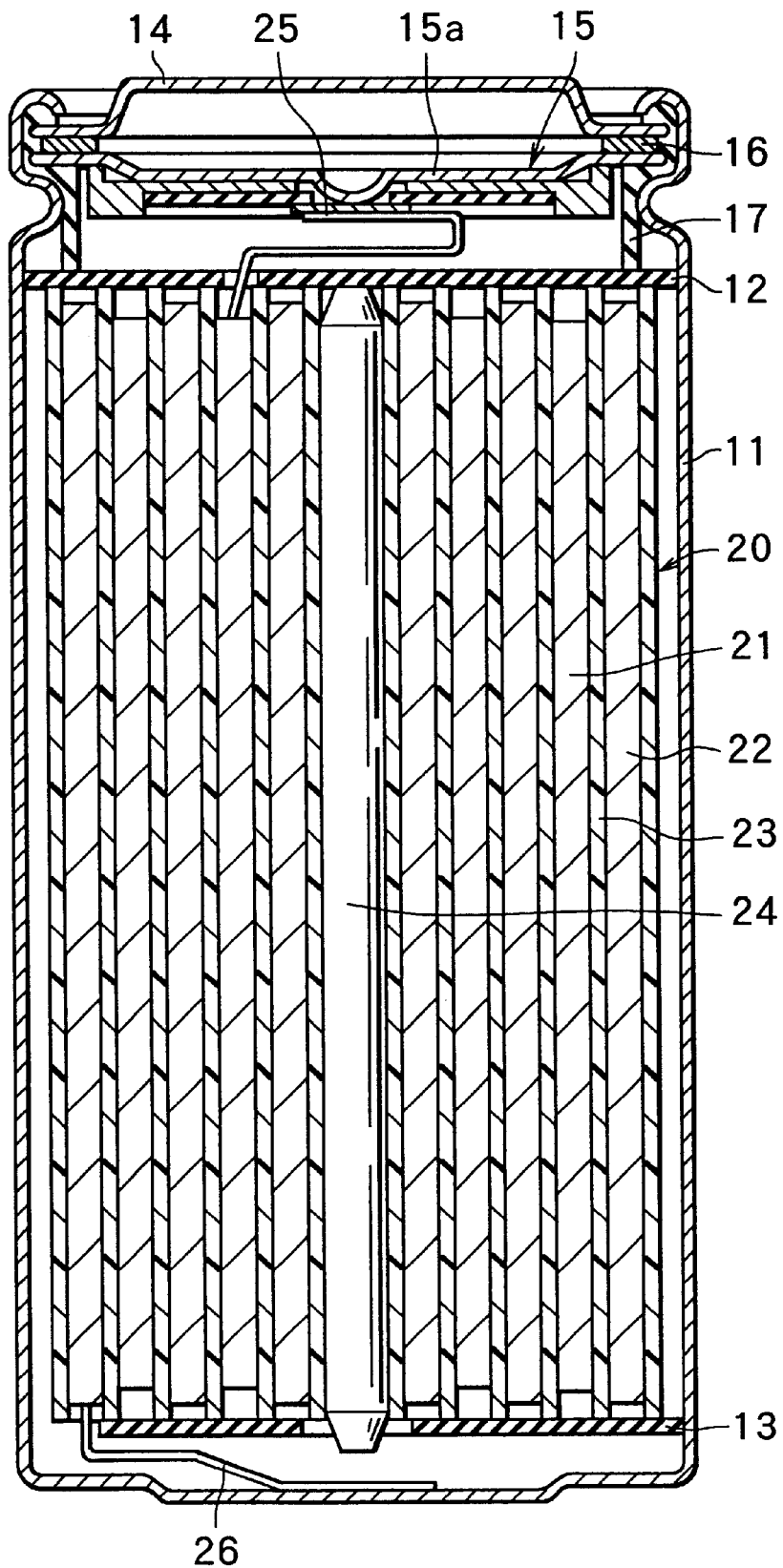
FIG. 1 is a cross section showing the configuration of a secondary battery using a positive electrode material according to an embodiment of the invention.

An embodiment of the invention will be described in detail hereinbelow with reference to the drawings.

The positive electrode material according to an embodiment of the invention has, for example, a particulate center portion capable of occluding and releasing lithium as a light metal and a coating portion provided to coat at least a part of the center portion. "Capable of occluding and releasing a light metal" are also expressed as "capable of occluding and releasing light metal ions".

The center portion is made of a transition metal oxide or transition metal sulfide which does not contain lithium such as titanium sulfide ($TiS_2$), molybdenum selenide ($MoSe_2$) or vanadium oxide ($V_2O_5$), a transition metal oxide or transition metal sulfide containing lithium, or a conductive high polymer material such as polyaniline or polypyrrole.

Particularly, since the transition metal oxide can allow a high voltage to be generated and can realize high energy density, it is preferable as a material of the center portion. Among transition metal oxides, those shown in Chemical Formulas 1 and 2 and $Li_4Mn_5O_{12}$ are preferable.

$$Li_aA_{1-b}B_bO_{2-c} \qquad \text{[Chemical Formula 1]}$$

where, A is a material selected from the group consisting of nickel (Ni), cobalt (Co), manganese (Mn), and iron (Fe), and B is at least one material selected from the group consisting of aluminum (Al), iron, copper (Cu), cobalt, chromium (Cr), magnesium (Mg), calcium (Ca), vanadium (V), nickel, silver (Ag), tin (Sn), boron (B), gallium (Ga), and an inner transition element. The value of (a) varies according to a charging/discharging state and usually satisfies $0 \leq a \leq 1.5$. The value of (b) satisfies $0 \leq b \leq 1$, and the value of (c) satisfies $0 \leq c \leq 0.5$.

$$Li_d Mn_{2-e} C_e O_{4-f}$$ [Chemical Formula 2]

where, C is at least one material selected from the group consisting of aluminum, iron, copper, cobalt, chromium, magnesium, calcium, vanadium, nickel, silver, tin, boron, gallium, and an internal transition element. The value of (d) varies according to a charging/discharging state and usually satisfies $0 \leq d \leq 1.5$. The value of (e) satisfies $0 \leq e \leq 1.5$, and the value of (f) satisfies $0 \leq f \leq 0.5$.

The coating portion is made of a conductive oxide, thereby suppressing the material of the center portion from being eluted and preventing a reaction product from being made and deposited while assuring the conductivity. The "coat" refers to a state where a substance capable of occluding and releasing lithium ions is not detected but only the peak of the conductive oxide is detected at the time of analyzing a part of the surface of the center portion by secondary ion mass spectrometry (SIMS).

The number of moles of the material of the coating portion per 1 mol of the material of the center portion lies in a range from 0.001 mol to 0.1 mol. When the number is smaller than 0.001 mol, the coating portion is small and a sufficient effect cannot be obtained. When the number is larger than 0.1 mol, the charging rate of the center portion decreases and the capacity also decreases, so that it is not preferable. A preferable ratio of the coating portion to 1 mol of the center portion lies in a range from 0.01 mol to 0.08 mol and, more preferably, in a range from 0.01 mol to 0.06 mol. In the range, a higher effect can be obtained. It is not necessary to uniformly provide the coating portion on the surface of the center portion. The coating portion may be non-uniform.

Examples of the conductive oxide of the coating portion are ITO (Indium Tin Oxide), tin oxide (IV) ($SnO_2$), ATO (Antimony Tin Oxide), FTO (Fluorine Tin Oxide), and FIO (Fluorine Indium Oxide). Preferably, the composition of ITO has a mol ratio between tin and indium of $0 \leq Sn/In \leq 10$.

With respect to positive electrode materials, the center portion may contain a plurality of kinds of materials and the coating portion may contain a plurality of kinds of materials. Each of the center portion and the coating portion may include a plurality of kinds of materials.

For example, the positive electrode material having such a composition can be produced as follows. A case of making the center portion of a lithium composite oxide will be described hereinafter.

First, for example, carbonate, nitrate, oxide, or hydroxide of lithium and carbonate, nitrate, oxide, or hydroxide of any of the elements making an oxide with lithium are fined and mixed so as to achieve a desired composition, and the mixture is sintered at a temperature in a range from 600 to 1000° C. in an atmosphere containing oxygen, thereby producing lithium composite oxide powders. By using the lithium composite oxide powders as a center portion, a coating portion is formed by applying a chemical method such as chemical reduction or a physical method such as deposition on at least a part of the surface of the center portion. In such a manner, the positive electrode material according to the embodiment is obtained.

For example, the positive electrode material like this is used for a secondary battery in the following manner.

FIG. 1 shows a sectional structure of a secondary battery using the positive electrode material according to the embodiment. The secondary battery is of what is called a cylindrical type. In a battery can 11 having a substantially hollow cylindrical column shape, a rolled electrode body 20 obtained by rolling strip-shaped positive electrode 21 and negative electrode 22 within a separator 23 inbetween is provided. The battery can 11 is made of, for example, iron plated with nickel. One end of the battery can 11 is closed and the other end is open. A pair of insulating plates 12 and 13 is disposed perpendicular to the peripheral face of the roll so as to sandwich the rolled electrode body 20.

A battery cover 14, and a safety valve mechanism 15 and a positive temperature coefficient (PTC) device 16 which are provided on the inside of the battery cover 14 are attached to the open end of the battery can 11 by being caulked via a gasket 17 and the battery can 11 is sealed. The battery cover 14 is made of, for example, a material similar to that of the battery can 11. The safety valve mechanism 15 is electrically connected to the battery cover 14 via the PTC device 16. When the internal pressure of the battery increases to a predetermined value or higher due to internal short circuit or heating from the outside or the like, a disk plate 15a is turned upside down, thereby disconnecting the electrical connection between the battery cover 14 and the rolled electrode body 20. The PTC device 16 is used to limit a current by an increase in resistance value when the temperature rises to thereby prevent abnormal heating caused by a heavy current which occurs due to external short circuit. The PTC device 16 is made of, for example, barium titanate based semiconductor ceramics. The gasket 17 is made of, for instance, an insulating material. Asphalt is applied on the surface of the gasket 17.

The rolled electrode body 20 is rolled around, for example, a center pin 24 as a center. A positive electrode lead 25 is led from the positive electrode 21, and a negative electrode lead 26 is led from the negative electrode 22. The positive electrode lead 25 is welded to the safety valve mechanism 15, thereby being electrically connected to the battery cover 14. The negative electrode lead 26 is welded and electrically connected to the battery can 11.

Figure 2:
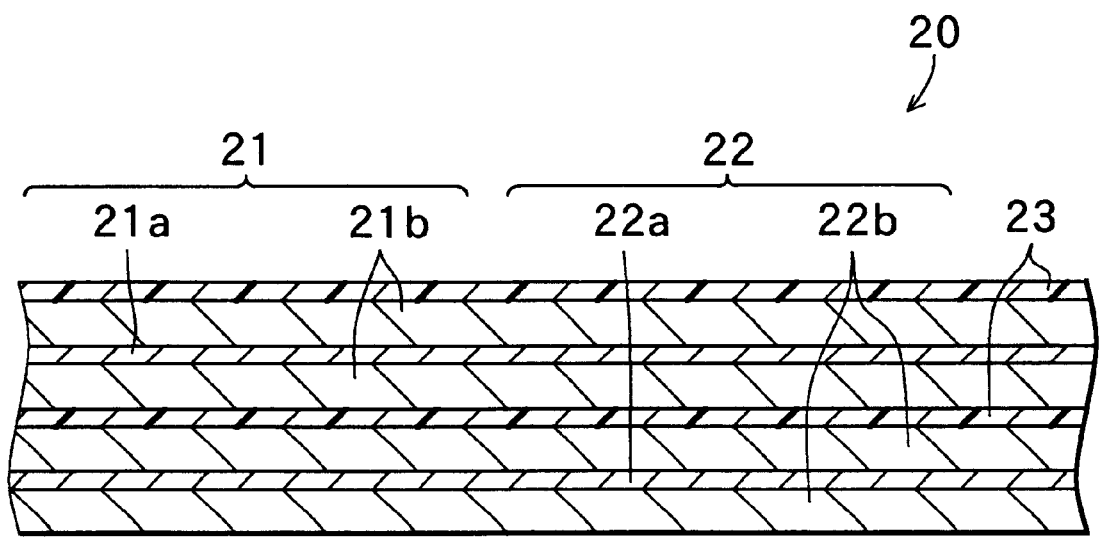
FIG. 2 is a cross section enlargedly showing a part of a rolled electrode body in the secondary battery illustrated in FIG. 1.

FIG. 2 enlargedly shows a part of the rolled electrode body 20 illustrated in FIG. 1. The positive electrode 21 has, for example, a structure in which a positive electrode mixture layer 21b is provided on each of both sides of a positive electrode collector layer 21a. The positive electrode collector layer 21a is made of, for example, metal foil such as aluminum foil, nickel foil, or stainless foil. The positive electrode mixture layer 21b contains, for example, the positive electrode material according to the embodiment, a conducting agent such as a graphite-based carbon material, an amorphous carbon material, or a metal material, and a binder such as polyvinylidene fluoride.

The negative electrode 22 has, for example in a manner similar to the positive electrode 21, a structure in which a negative electrode mixture layer 22b is provided on each of both sides of a negative electrode collector layer 22a. The negative electrode collector layer 22a is made of, for instance, metal foil such as copper foil, nickel foil, or stainless steel foil. The negative electrode mixture layer 22b contains one or more negative electrode materials capable of occluding and releasing a lithium metal or lithium.

Examples of the negative electrode material capable of occluding and releasing lithium are a metal or a semiconductor which can make an alloy or compound with lithium, and alloys or compounds of the metal and semiconductor and lithium. Each of the metals, alloys, and compounds is expressed by, for example, a chemical formula of $D_x E_y Li_z$ where, D denotes at least one kind of a metal element and a semiconductor element each of which can make an alloy or compound with lithium, E denotes at least one kind of metal elements and semiconductor elements except for lithium and D, and the values of x, y, and z satisfy $x>0$, $y \geqq 0$, and $z \geqq 0$, respectively.

Among them, as a metal element or semiconductor element which can make an alloy or compound with lithium, a metal element or semiconductor element of the 4B group is preferable. Silicon or tin is more preferable, and silicon is the most preferable. Alloys and compounds of tin and silicon are also preferable and, specifically, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$ and $ZnSi_2$ can be mentioned.

As negative electrode materials capable of occluding and releasing lithium, a carbon material, a metal oxide, a high polymer material, and the like can be also mentioned. Examples of the carbon materials are pyrocarbons, cokes, graphite, glassy carbons, high polymer organic compound sintered materials, carbon fiber, and activated carbon. The cokes include pitch coke, needle coke, and petroleum coke. The high polymer organic compound sintered material is a material obtained by sintering a high polymeric material such as phynolic resin or furan resin at an appropriate temperature so as to be carbonated. An example of the metal oxide is tin oxide ($SnO_2$). Examples of the high polymeric materials are polyacetylene and polypyrrole.

The separator 23 is used to isolate the positive electrode 21 and the negative electrode 22 from each other, and to pass lithium ions while preventing short circuit of a current caused by contact between the positive and negative electrodes. The separator 23 is made of, for example, a porous film made of a polyolefin-based material such as polypropylene or polyethylene or a porous film made of an inorganic material such as ceramic nonwoven cloth. A structure in which two or more kinds of porous films are stacked may be also used.

The separator 23 is impregnated with an electrolytic solution which is a liquid electrolyte. The electrolytic solution is obtained by, for example, dissolving a lithium salt as an electrolytic salt in a solvent. Preferable solvents are, for example, organic solvents, that is, nonaqueous solvents such as propylene carbonate, ethylene carbonate, 1,2-dimethoxyethane, 1,2-diethoxyethane, diethyl carbonate, dimethyl carbonate, methyl ethyl carbonate, γ-butyrolactone, tetrahydrofuran, 1,3-dioxolane, 4-methyl-1,3-dioxolane, diethyl ether, sulfolane, methyl sulfolane, acetonitrile, and propionitrile. One or more than two kinds of the above solvents may be mixed and used.

Examples of lithium salts are $LiClO_4$, $LiAsF_6$, $LiPF_6$, $LiBF_4$, $LiB(C_6H_5)_4$, LiCl, LiBr, $CH_3SO_3Li$ and $CF_3SO_3Li$. One or more than two kinds of them are mixed and used.

For example, this secondary battery can be produced as follows.

First, for instance, a positive electrode mixture is prepared by mixing the positive electrode material according to the embodiment, a conducting agent, and a binder. The positive electrode mixture is dispersed in a solvent of N-methyl-2-pyrrolidone or the like to thereby obtain a positive electrode mixture slurry in a paste state. The positive electrode mixture slurry is applied on the positive electrode collector layer 21a, dried, and compression molded by a roller press or the like, thereby forming the positive electrode mixture layer 21b. In such a manner, the positive electrode 21 is fabricated.

Subsequently, for example, a carbon material and a binder are mixed to prepare a negative electrode mixture. The negative electrode mixture is dispersed in a solvent of N-methyl-2-pyrrolidone or the like to thereby obtain a negative electrode mixture slurry. The negative electrode mixture slurry is applied on the negative electrode collector layer 22a, dried, and compression molded by a roller press or the like, thereby forming the negative electrode mixture layer 22b. In such a manner, the negative electrode 22 is fabricated.

Subsequently, the positive electrode lead 25 is attached to the positive electrode collector layer 21a by welding or the like, and a negative electrode lead 26 is attached to the negative electrode collector layer 22a by welding or the like. After that, the positive electrode 21 and the negative electrode 22 are rolled with the separator 23 inbetween, the top of the negative electrode lead 26 is welded to the battery can 11, the top of the positive electrode lead 25 is welded to the safety valve mechanism 15, and the rolled positive electrode 21 and negative electrode 22 are sandwiched by the pair of insulating plates 12 and 13 and enclosed in the battery can 11. After the positive electrode 21 and the negative electrode 22 are enclosed in the battery can 11, the electrolyte is injected into the battery can 11 and the separator 23 is impregnated with the electrolyte. The battery cover 14, the safety valve mechanism 15, and the PTC device 16 are fixed to the open end of the battery can 11 via the gasket 17 by caulking. In such a manner, a secondary battery shown in FIG. 1 is formed.

The secondary battery acts as follows.

When the secondary battery is charged, for example, the lithium is released as ions from the center portion of the positive electrode material included in the positive electrode 21 and occluded by the negative electrode 22 via the electrolytic solution with which the separator 23 is impregnated. When the secondary battery is discharged, for example, the lithium is released as ions from the negative electrode 22 and occluded by the center portion of the positive electrode material included in the positive electrode 21 via the electrolytic solution with which the separator 23 is impregnated. Since the positive electrode 21 is formed by using the positive electrode material in which the coating portion made of a conductive oxide is provided on at least a part of the surface of the center portion, elution of the positive electrode material into the electrolytic solution is suppressed, and deposition of the reaction product on the surface of the positive electrode 21 caused by repetition of charging and discharging is prevented. Since the coating portion of the positive electrode material is made of a conductive oxide, the conductivity in the positive electrode 21 is assured. Thus, the charging/discharging cycle characteristic, shelf stability, and discharging load characteristic are improved.

In the positive electrode material according to the embodiment, the coating portion made of a conductive oxide is provided on at least a part of the surface of the center portion, high conductivity can be obtained and elution of the substance in the center portion into the electrolyte is suppressed. Consequently, when the positive electrode 21 of the secondary battery is formed by using the positive electrode material, while assuring the conductivity of the positive electrode 21, the elution of the positive electrode material into the electrolytic solution can be suppressed, and deposition of the reaction product between the positive electrode material and the electrolytic solution onto the surface of the positive electrode 21 caused by repetition of charging and discharging can be prevented. Thus, the charging/ discharging cycle characteristic, shelf stability, and discharging load characteristic can be improved.

EXAMPLES

Further, examples of the invention will be described in detail.

Example 1

First, lithium carbonate ($Li_2CO_3$) and manganese carbonate ($MnCO_3$) were prepared at a mole ratio of lithium carbonate:manganese carbonate=1:4 and mixed by using a mortar. The mixture was sintered at 750° C. for 48 hours in the air, thereby synthesizing powders of an oxide ($LiMn_2O_4$) of lithium and manganese. The obtained $LiMn_2O_4$ powders and ITO powders (made by Kojundo Chemical Laboratory Co., Ltd., at a mole ratio of tin and indium of Sn/In=0.1) were prepared at a ratio of 1 mol of $LiMn_2O_4$ to 0.04 mol of ITO and mixed in a mortar by using ethanol, and the mixture was dried at 60 degrees. Subsequently, the mixture was subjected to heat treatment at 700° C. and fined, thereby obtaining a positive electrode material.

As for the obtained positive electrode material, a qualitative analysis was conducted by SIMS and X-ray diffraction, and a quantitative analysis was carried out by X-ray fluorescence spectrometry. It was recognized that at least a part of the center portion made of $LiMn_2O_4$ is covered with the coating portion made of ITO and the quantity of the coating portion is at a ratio of 1 mol of $LiMn_2O_4$ to 0.04 mol of ITO.

A secondary battery similar to that shown in FIG. 1 was fabricated by using the positive electrode material as follows. First, 86 percentage by mass of the obtained positive electrode material, 10 percentage by mass of graphite as a conducting agent, and 4 percentage by mass of polyvinylidene fluoride as a binder were mixed to prepare a positive electrode mixture. The positive electrode mixture was dispersed in N-methyl-pyrrolidone as a solvent, thereby obtaining a positive electrode mixture slurry. After that, the positive electrode mixture slurry was uniformly applied on both sides of a positive electrode collector layer made of aluminum foil in a strip shape having a thickness of 20 μm, dried, and compression molded by a roller press, thereby forming a strip-shaped positive electrode. When the packing density of the positive electrode mixture layer was measured, it was 2.8 g/cm³. After that, a positive electrode lead was attached to one end of the positive electrode collector layer.

Artificial graphite powders and polyvinylidene fluoride as a binder were respectively mixed at a ratio of 90 percent by mass and 10 percent by mass, thereby preparing a negative electrode mixture. The negative electrode mixture was dispersed in N-methylpyrrolidone as a solvent to obtain a negative electrode mixture slurry. After that, the negative electrode mixture slurry was applied on both sides of a negative electrode collector layer made of copper foil in a strip shape having a thickness of 10 μm, dried, and compression molded by a roller press, thereby forming a strip-shaped negative electrode. After that, a negative electrode lead was attached to one end of the negative electrode collector layer.

After obtaining the positive electrode and the negative electrode, the positive and negative electrodes were rolled via a separator 23 made by a fine porous polypropylene film many times, thereby forming a rolled electrode body. After fabricating the rolled electrode body, the rolled electrode body was sandwiched by a pair of insulating plates, the negative electrode lead was welded to the battery can, the positive electrode lead was welded to the battery cover, the rolled electrode body was enclosed in the battery can, and the electrolytic solution was injected into the battery can so that the separator was impregnated with the electrolytic solution. The electrolytic solution was obtained by dissolving $LiPF_6$ into a solvent in which ethylene carbonate and methyl ether carbonate were mixed at the volume ratio of 1:1 so as to attain a concentration of 1 mol/dm³. After that, the battery cover, the safety valve mechanism, and the PTC device are fixed to the battery can via the gasket. In such a manner, a secondary battery of a cylindrical shape having an outer diameter of 18 mm and a height of 65 mm was obtained.

The obtained secondary battery was repeatedly charged and discharged at room temperature to conduct a cycle characteristic test. The charging was performed with a constant current of 600 mA until the battery voltage reaches 4.2 V and, after that, by a constant voltage of 4.2 V until the total charging time reaches four hours. On the other hand, the discharging was performed with a constant current of 600 mA until the battery voltage reaches 3.0 V. The discharge capacity in the first and $500^{th}$ cycles were obtained, and the ratio of the discharge capacity in the $500^{th}$ cycle to that in the first cycle, that is, the capacity maintaining ratio in the $500^{th}$ cycle was calculated. The result is shown in Table 1.

TABLE 1

| | Ratio of ITO to 1 mol of | Discharge capacity (mAh) | | Cycle capacity maintaining |
|---|---|---|---|---|
| | $LiMn_2O_4$ | $1^{st}$ cycle | $500^{th}$ cycle | ratio (%) |
| Example 1 | 0.04 | 1201 | 901 | 75 |
| Comparative example 1 | 0 | 1211 | 727 | 60 |

A shelf stability test under a high temperature was conducted on the obtained secondary battery. The secondary battery was stored at 45° C. for 20 days. The secondary battery was charged and discharged for five cycles at room temperature before and after being stored. At this time, the charging and discharging was performed under the same conditions as those of the cycle characteristic test. The discharge capacity in the first cycle before the storage and that after the storage were measured, and the ratio of the discharge capacity after the storage to that before the storage, that is, the storage capacity maintaining ratio after 20 days was measured. The result is shown in Table 2.

TABLE 2

| | Ratio of ITO to 1 mol of | Discharge capacity (mAh) | | Storage |
|---|---|---|---|---|
| | $LiMn_2O_4$ (mol) | before storage | after storage | Capacity maintaining ratio (%) |
| Example 1 | 0.04 | 1201 | 1081 | 90 |
| Comparative example 1 | 0 | 1211 | 981 | 81 |

Further, obtained two secondary batteries were used to conduct a discharge load characteristic test. After storing the secondary batteries at 45° C. for 20 days, the secondary batteries were charged under the same conditions as those of the cycle characteristic test. One of the batteries was discharged with a constant current of 600 mA until the battery voltage reached 3.0 V, and the other battery was discharged with a constant current of 1200 mA until the battery voltage reached 3.0 V. The discharge capacity in the case of discharging with 600 mA and that in the case of discharging with 1200 mA were obtained, and the ratio of the discharge capacity with 1200 mA to that with 600 mA, that is, the discharge load characteristic after storage at high temperature was examined. The result is shown in Table 3.

TABLE 3

| | Ratio of ITO to 1 mol of $LiMn_2O_4$ (mol) | Discharge capacity (mAh) | | Discharge load characteristic |
|---|---|---|---|---|
| | | discharge 600 mA | current 1200 mA | |
| Example 1 | 0.04 | 1081 | 940 | 87 |
| Comparative example 1 | 0 | 981 | 687 | 70 |

As Comparative Example 1 relative to Example 1, a positive electrode material was fabricated in a manner similar to Example 1 except for obtaining a positive electrode material by using $LiMn_2O_4$ powders as they are without providing the coating portion made of ITO, and a secondary battery was fabricated similarly. In a manner similar to Example 1, a cycle characteristic test, a shelf stability test, and a discharge load characteristic test were conducted on the secondary batteries. The results are shown in Tables 1 to 3.

As understood from Tables 1 to 3, in Example 1, higher values with respect to all of the capacity maintaining ratio regarding cycles, the capacity maintaining ratio regarding storage, and the discharge load characteristic were obtained as compared with Comparative Example 1. As understood by comparison in the first cycle (Table 1) in the cycle characteristic test, the discharge capacity in Example 1 and that of Comparative Example 1 are almost equal to each other. That is, it is understood that, by providing the coating portion made of ITO, the charge/discharge cycle characteristic, the shelf stability, and the discharge load characteristic can be improved, and the conductivity can be assured.

Examples 2 to 7

As Examples 2 to 7, positive electrode materials were fabricated in a manner similar to Example 1 except that the mixing ratio of $LiMn_2O_4$ powders and ITO powders was changed and the quantity of the coating portion made of ITO per 1 mol of the center portion made of $LiMn_2O_4$ was varied as shown in Table 4, and secondary batteries were similarly fabricated.

TABLE 4

| | Material of coating portion | Ratio of ITO to 1 mol of $LiMn_2O_4$ (mol) | Capacity ratio (%) cycle | maintaining storage | Discharge load characteristic (%) |
|---|---|---|---|---|---|
| Example | | | | | |
| 2 | ITO | 0.001 | 68 | 85 | 75 |
| 3 | ITO | 0.01 | 69 | 87 | 78 |
| 4 | ITO | 0.02 | 71 | 89 | 82 |
| 5 | ITO | 0.06 | 72 | 93 | 85 |

TABLE 4-continued

| | Material of coating portion | Ratio of ITO to 1 mol of $LiMn_2O_4$ (mol) | Capacity ratio (%) cycle | maintaining storage | Discharge load characteristic (%) |
|---|---|---|---|---|---|
| 6 | ITO | 0.08 | 68 | 93 | 81 |
| 7 | ITO | 0.1 | 66 | 93 | 75 |
| Comparative Example | | | | | |
| 2 | ITO | 0.0001 | 63 | 82 | 71 |
| 3 | ITO | 0.12 | 61 | 93 | 72 |
| 1 | — | 0 | 60 | 81 | 70 |

As Comparative Examples 2 and 3 relative to Examples 2 to 7, positve electrode materials were prepared in a manner similar to Example 1 except that the quantity of the coating portion made of ITO per 1 mol of the enter portion made of $LiMn_2O_4$ was varied as shown in Table 4, and secondary batteries were produced similarly.

The cycle characteristic test, the shelf stability test, and the discharge load characteristic test were conducted on the secondary batteries of Examples 2 to 7 and Comparative Examples 2 and 3 in a manner similar to Example 1. The results are shown in Table 4. Table 4 also shows the result of Comparative Example 1.

As understood from Table 4, in Examples 2 to 7, higher values with respect to all of the capacity maintaining ratio regarding cycles, the capacity maintaining ratio regarding storage, and the discharge load characteristic were obtained as compared with Comparative Example 1 as in Example 1. With respect to the capacity maintaining ratio regarding cycles and the discharge load characteristic, values higher than those of Comparative Examples 2 and 3 were obtained. Although not shown in Table 4, the discharge capacity in Comparative Example 3 is smaller as compared with Examples 1 to 7 and Comparative Examples 1 and 2. That is, it is understood that, by setting the quantity of the coating portion per 1 mol of the center portion in a range from 0.001 mol to 0.1 mol, the cycle characteristic, the shelf stability, and the discharge load characteristic can be improved while assuring conductivity.

In Examples 3 to 6, high values with respect to the discharge load characteristic were obtained. In Examples 3 to 5, with respect to the capacity maintaining ratio regarding cycles, high values were obtained. That is, it is understood that, by setting the ratio of the coating portion to 1 mol of the center portion in a range from 0.01 mol to 0.08 mol, the discharge load characteristic can be improved, and by setting the ratio of the coating portion to 1 mol of the center portion in a range from 0.01 mol to 0.06 mol, the charge/discharge cycle characteristic can be improved.

Examples 8 and 9

As Example 8, a positive electrode material was prepared in a manner similar to Example 1 except that the coating portion was formed by using $SnO_2$ powders (made by Wako Pure Chemical Industries, Ltd.) in place of ITO powders, and a secondary battery was similarly fabricated. As Example 9, a positive electrode material was prepared in a manner similar to Example 1 except that the coating portion was formed by using mixture powders obtained by mixing ITO powders and $SnO_2$ powders at a mole ratio of 1:1 in place of ITO powders, and a secondary battery was similarly fabricated.

Further, as Comparative Example 4 relative to Examples 1, 8 and 9, a positive electrode material was prepared under the same conditions as those of Example 1 except that calcium oxide (CaO) powders were used in place of ITO powders, and a secondary battery was similarly fabricated. Furthermore, as Comparative Example 5, a positive electrode material was prepared under the same conditions as those of Example 1 except that gallium oxide ($Ga_2O_3$) powders were used in place of ITO powders, and a secondary battery was similarly fabricated.

The cycle characteristic test, the shelf stability test, and the discharge load characteristic test were conducted on the secondary batteries of Examples 8 and 9 and Comparative Examples 4 and 5 in a manner similar to Example 1. The results are shown in Table 5. Table 5 also shows the results of Example 1 and Comparative Example 1.

TABLE 5

| | Material of coating portion | Ratio of coating portion to 1 mol of center portion (mol) | Cycle capacity maintaining ratio (%) | Storage capacity maintaining ratio (%) | Discharge load characteristic (%) |
|---|---|---|---|---|---|
| Example | | | | | |
| 8 | $SnO_2$ | 0.04 | 73 | 88 | 88 |
| 9 | ITO & $SnO_2$ | 0.04 | 73 | 89 | 88 |
| 1 | ITO | 0.04 | 75 | 90 | 87 |
| Comparative Example | | | | | |
| 4 | CaO | 0.04 | 63 | 89 | 60 |
| 5 | $Ga_2O_3$ | 0.04 | 59 | 85 | 52 |
| 1 | — | 0 | 60 | 81 | 70 |

As understood from Table 5, in Examples 8 and 9, values almost equal to those of Example 1 were obtained regarding all of the capacity maintaining ratio regarding cycles, the capacity maintaining ratio with respect to storage, and the discharge load characteristic. On the contrary, in Comparative Examples 4 and 5, since elution of the positive electrode material was suppressed by the coating portion, the storage capacity maintaining ratio was improved more than Comparative Example 1. However, conductivity deteriorates, so that the capacity maintaining ratio regarding cycles and the discharge load characteristic deteriorate. That is, it is understood that, when the coating portion is made of not necessarily ITO but a conductive oxide, the cycle characteristic, the shelf stability, and the discharge load characteristic can be improved.

Although not specifically described here, by making the center portion of other transition metal oxide such as manganese dioxide ($MnO_2$), molybdenum trioxide ($MoO_3$), or vanadium pentoxide ($V_2O_5$) in place of $LiMn_2O_4$, similar effects can be obtained. When the center portion is made of, not necessarily a transition metal oxide, but other material capable of occluding and releasing lithium such as titanium sulfide, similar effects can be obtained. Further, also in the case of making the coating portion of other conductive oxide in place of ITO or tin oxide, similar effects can be obtained.

Although the invention has been described by the foregoing embodiment and examples, the invention is not limited to the embodiment and the examples but can be variously modified. For example, although the case where the center portion is made of a material capable of occluding and releasing lithium has been described in the embodiment and examples, the invention can be also applied to a case where the center portion is made of a material capable of occluding and releasing other light metal such as natrium (Na), kalium (K), calcium (Ca) or magnesium (Mg).

In the foregoing embodiment and examples, the cylindrical secondary battery having the rolled structure has been described as a specific example. The invention can be also applied to a cylindrical secondary battery having other configuration. Further, the invention can be similarly applied to a secondary battery having a shape other than the cylindrical shape, such as a coin shape, a button shape, or a rectangular shape.

In addition, in the embodiment and examples, the secondary battery using an electrolyte solution as a liquid electrolyte has been described. In place of an electrolyte solution, a solid-state electrolyte or a gel-state electrolyte in which an electrolyte salt is dissolved may be used. For example, a solid-state electrolyte is obtained by dissolving or dispersing an electrolyte salt in an ion conductive polymer, and a gel-state electrolyte obtained by holding the electrolytic solution by a polymer.

In the positive electrode material according to the invention, the coating portion made of a conductive oxide is provided on at least a part of the center portion at the ratio of the center portion to the coating portion of 1 mol to a value in a range from 0.001 mol to 0.1 mol. Thus, elution of the substance in the center portion can be suppressed while assuring conductivity.

In the secondary battery according to the invention, since the positive electrode is formed by using the positive electrode material of the invention, while assuring the conductivity in the positive electrode, elution of the positive electrode material can be suppressed, and a reaction product can be prevented from being made and deposited on the surface of the positive electrode even when charging and discharging is repeated. Thus, the charging/discharging cycle characteristic, shelf stability, and discharge load characteristic can be improved.

Obviously many modifications and variations of the present invention are possible in the light of the above teachings. It is therefore to be understood that within the scope of the appended claims the invention may be practiced other wise than as specifically described.

What is claimed is:

1. A positive electrode material in which a coating portion made of a conductive oxide is provided on at least a part of a particulate substance capable of occluding and releasing a light metal, wherein a quantity of the conductive oxide coated is in a range from 0.001 mol to 0.1 mol per 1 mol of the particulate substance capable of occluding and releasing a light metal, and wherein the coating portion contains at least one material selected from the group consisting of tin oxide ($SnO_2$), tin oxide containing fluorine, an oxide containing indium (In) and tin (Sn), and an oxide containing antimony (Sb) and tin (Sn).

2. A positive electrode material according to claim 1, wherein the particulate substance capable of occluding and releasing a light metal is made of an oxide containing a transition metal.

3. A positive electrode material according to claim 1, wherein the particulate substance capable of occluding and releasing a light metal is made of a transition metal oxide containing lithium (Li).

4. A positive electrode material according to claim 1, wherein the particulate substance capable of occluding and releasing a light metal is made of a transition metal oxide containing lithium (Li) shown in Chemical Formula 1 or 2, $$Li_aA_{1-b}B_bO_{2-c} \quad \text{(Chemical Formula 1)}$$

where, A is a material selected from the group of Ni, Co, Mn, and Fe, and B is at least one material selected from the group of Al, Fe, Cu, Co, Cr, Mg, Ca, V, Ni, Ag, Sn, B, Ga, and an inner transition element, a value of (a) varies according to a charging/discharging state and is usually $0 \leq a \leq 1.5$, a value of (b) is $0 \leq b \leq 1$, and a value of (c) is $0 \leq c \leq 0.5$, $$Li_dMn_{2-e}C_eO_{4-f} \quad \text{(Chemical Formula 2)}$$

where, C is at least one material selected from the group of Al, Fe, Cu, Co, Cr, Mg, Ca, V, Ni, Ag, Sn, B, Ga, and an inner transition element, a value of (d) varies according to a charging/discharging state and is $0 \leq d \leq 1.5$, a value of (e) is $0 \leq e \leq 1.5$ and a value of (f) is $0 \leq f \leq 0.5$.

5. A positive electrode material according to claim 1, wherein the particulate substance capable of occluding and releasing a light metal is $LiMn_2O_4$ or $Li_4Mn_5O_{12}$.

6. A positive electrode material according to claim 1, wherein the quantity of the conductive oxide coated is in a range from 0.01 mol to 0.08 mol per 1 mol of the particulate substance capable of occluding and releasing a light metal.

7. A positive electrode material according to claim 1, wherein the quantity of the conductive oxide coated is in a range from 0.01 mol to 0.06 mol per 1 mol of the particulate substance capable of occluding and releasing a light metal.

8. A nonaqueous secondary battery comprising a positive electrode, a negative electrode, and an electrolyte:
wherein the positive electrode contains a positive electrode material in which a coating portion made of a conductive oxide is provided on at least a part of a particulate substance capable of occluding and releasing a light metal, and a quantity of the conductive oxide coated in the positive electrode material is in a range from 0.001 mol to 0.1 mol per 1 mol of the particulate substance capable of occluding and releasing a light metal, and
wherein the coating portion contains at least one material selected from the group consisting of tin oxide ($SnO_2$), tin oxide containing fluorine, an oxide containing indium (In) and tin (Sn), and an oxide containing antimony (Sb) and tin (Sn).

9. A nonaqueous secondary battery according to claim 8, wherein the particulate substance contained in the positive electrode and capable of occluding and releasing a light metal is made of an oxide containing a transition metal.

10. A nonaqueous secondary battery according to claim 8, wherein the particulate substance contained in the positive electrode and capable of occluding and releasing a light metal is made of a transition metal oxide containing lithium (Li).

11. A nonaqueous secondary battery according to claim 8, wherein the particulate substance, contained in the positive electrode and capable of occluding and releasing a light metal is made of a transition metal oxide containing lithium (Li) shown in Chemical Formula 3 or 4, $$Li_aA_{1-b}B_bO_{2-c} \quad \text{(Chemical Formula 3)}$$

where, A is a material selected from the group of Ni, Co, Mn, and Fe, and B is at least one material selected from the group of Al, Fe, Cu, Co, Cr, Mg, Ca, V, Ni, Ag, Sn, B, Ga, and an inner transition element, a value of (a) varies according to a charging/discharging state and is usually $0 \leq a \leq 1.5$, a value of (b) is $0 \leq b \leq 1$ and a value of (c) is $0 \leq c \leq 0.5$, $$Li_dMn_{2-e}C_eO_{4-f} \quad \text{(Chemical Formula 4)}$$

where, C is at least one material selected from the group of Al, Fe, Cu, Co, Cr, Mg, Ca, V, Ni, Ag, Sn, B, Ga, and an inner transition element, a value of (d) varies according to a charging/discharging state and is usually $0 \leq d \leq 1.5$, a value of (e) is $0 \leq e \leq 1.5$, and a value of (f) is $0 \leq f \leq 0.5$.

12. A nonaqueous secondary battery according to claim 8, wherein the particulate substance, contained in the positive electrode and capable of occluding and releasing a light metal is $LiMn_2O_4$ or $Li_4Mn_5O_{12}$.

13. A nonaqueous secondary battery according to claim 8, wherein the quantity of the conductive oxide coated in the positive electrode material is a value in a range from 0.01 mol to 0.08 mol per 1 mol of the particulate substance capable of occluding and releasing a light metal.

14. A nonaqueous secondary battery according to claim 8, wherein the quantity of the conductive oxide coated in the positive electrode material is a value in a range from 0.01 mol to 0.06 mol per 1 mol of the particulate substance capable of occluding and releasing a light metal.

15. A nonaqueous secondary battery according to claim 8, wherein the negative electrode contains at least one negative electrode material selected from the group consisting of a metal capable of occluding and releasing lithium (Li), alloys and compounds of the metal, and a carbon material.

16. A nonaqueous secondary battery according to claim 8, comprising:
a strip-shaped positive electrode in which a positive electrode mixture containing a positive electrode material, a conducting agent, and a binder is provided on both sides of a positive electrode collector layer;
a strip-shaped negative electrode in which a negative electrode mixture containing a negative electrode material and a binder is provided on both sides of a negative electrode collector layer; and
an electrolyte containing a lithium salt and a nonaqueous solvent,
wherein the positive electrode and the negative electrode are rolled (as a rolled body) with a fine porous separator made of a polyolefin material inbetween.

17. The nonaqueous secondary battery according to claim 16, wherein the positive electrode collector is made of aluminum foil and the negative electrode collector is made of copper foil.

* * * * *